US006924845B1

(12) United States Patent  (10) Patent No.: US 6,924,845 B1
Wahlroos  (45) Date of Patent: Aug. 2, 2005

(54) VALUE ADDED DIGITAL VIDEO RECEIVER

(75) Inventor: Esa Wahlroos, Turku (FI)

(73) Assignee: Nokia Corporation, (FI)

( * ) Notice: Subject to any disclaimer, the term of this patent is extended or adjusted under 35 U.S.C. 154(b) by 591 days.

(21) Appl. No.: 09/939,377

(22) Filed: Aug. 24, 2001

(51) Int. Cl.$^7$ .............................................. H04N 5/44
(52) U.S. Cl. ...................... 348/553; 348/559; 348/738
(58) Field of Search ............................... 348/553, 559, 348/714, 563, 564, 565, 567, 571, 584, 738, 348/730, 722, 484, 512, 515, 725; H04N 5/445, H04N 5/44; 386/96, 102; 725/32

(56) References Cited

U.S. PATENT DOCUMENTS

| | | | |
|---|---|---|---|
| 4,855,813 A * | 8/1989 | Russell et al. .............. | 348/559 |
| 5,317,399 A * | 5/1994 | Satake et al. ............... | 348/571 |
| 5,329,320 A * | 7/1994 | Yifrach ....................... | 348/738 |
| 5,423,555 A | 6/1995 | Kidrin | |
| 5,483,257 A | 1/1996 | Otake et al. | |
| 5,548,340 A * | 8/1996 | Bertram ...................... | 348/559 |
| 5,729,280 A * | 3/1998 | Inoue et al. ................ | 725/101 |
| 6,275,989 B1 | 8/2001 | Broadwin et al. | |
| 6,295,094 B1 * | 9/2001 | Cuccia ........................ | 348/559 |
| 6,490,000 B1 * | 12/2002 | Schaefer et al. ............ | 348/553 |

FOREIGN PATENT DOCUMENTS

| EP | 0 661 658 A2 | 7/1995 |
|---|---|---|
| EP | 1 089 470 A1 | 4/2001 |
| WO | WO 98/57718 | 12/1998 |
| WO | WO 00/65429 | 11/2000 |

OTHER PUBLICATIONS

European Telecommunications Standards Institute, "Digital Video Broadcasting (DVB); Specification for Service Information (SI) in DVB Systems", EN 300 468 V1.3.1 (Feb. 1998).

European Telecommunications Standards Institute, "Digital Video Broadcasting (DVB); Implementation Guidelines for the Use of MPEG-2 Systems, Video and Audio in Satellite, Cable and Terrestrial Broadcasting Applications", ETSI TR 101 154 V1.4.1 (Jul. 2000).

R. Koenen et al., Signal Processing Image Communication 9 (1997) pp295-304.

* cited by examiner

Primary Examiner—Michael H. Lee
(74) Attorney, Agent, or Firm—Banner & Witcoff, Ltd.

(57) ABSTRACT

Methods and systems are provided for customizing a digital broadcast receiver. Video and audio clips may be captured from a broadcast signal after receiving commands from a user. The captured clips may then be used to provide background images and sounds. Sounds may also be assigned to broadcast receiver events.

7 Claims, 7 Drawing Sheets

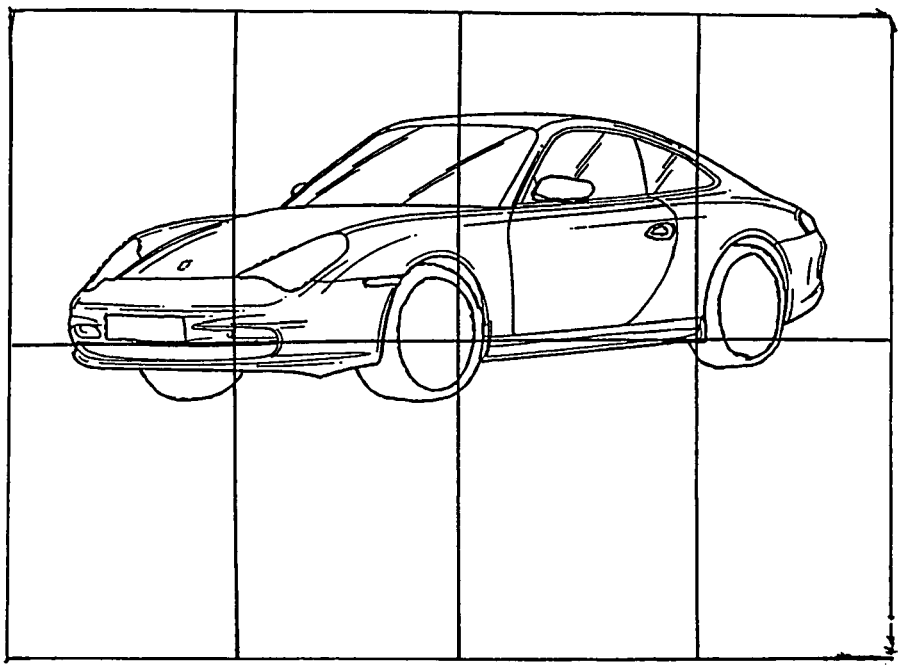
Fig. 5    500
600
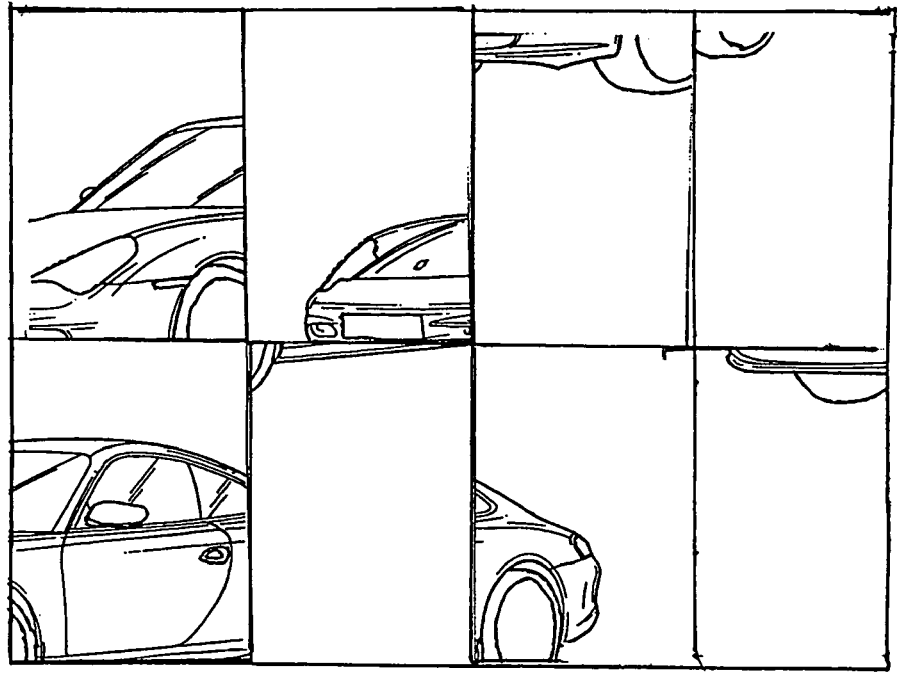
Fig. 6

VALUE ADDED DIGITAL VIDEO RECEIVER

BACKGROUND OF THE INVENTION

1. Field of the Invention

The invention relates to data transmission. More particularly, the invention relates to systems and methods for customizing the operation and user interface elements of digital broadcast receivers.

2. Description of Related Art

It is common today for audio and visual programs to be broadcasted in digital formats such as DVB-S, DVB-C and DVB-T. The broadcasted signals are typically received at digital broadcast receivers (set-top boxes) and converted to television signals for transmission to televisions. Prior art digital broadcast receivers have standard operations and generate relatively standard user interface screens that users cannot customize.

Existing digital broadcast receivers have not taken advantage of the ease with which digital signals can be captured, stored, manipulated and retrieved. As a result, users have been limited in their ability to customize the operation of digital broadcast receivers. For example, when tuned to an audio channel on a conventional digital broadcast receiver, users sometimes view a blank screen or an alphanumeric description of the audio broadcast. Users have also been limited in their ability to customize user interface elements.

Therefore, there is a need in the art for digital broadcast receiver systems and methods that allow users to customize the operation of digital broadcast receivers. There is also a need in the art for digital broadcast receiver systems and methods that allow users to manipulate the data received at the receiver to customize the operation of receiver.

BRIEF SUMMARY OF THE INVENTION

The above-mentioned needs in the art are satisfied by the disclosed systems and methods that allow users to customize digital broadcast receivers by capturing and utilizing video and audio clips.

In a first embodiment of the invention, a method of generating a background image for a television is provided. The method includes receiving a broadcast signal including video data converting the broadcast signal to a television input signal. Next, the television input signal is transmitted to a television. A picture frame is stored in a memory after receiving a capture command.

In another embodiment of the invention, a method of generating an event sound for a digital broadcast receiver is provided. The method includes receiving a digital audio stream and a capture command. After receiving the capture command, a portion of the digital audio stream is stored in a memory. An event association command identifying an event and the portion of the digital audio stream is also received. Finally, the portion of the digital audio stream is retrieved from the memory when the event takes places.

In yet another embodiment of the invention, a digital broadcast receiver include a central processing unit and an interface module for coupling the receiver to a computer device. A memory module is also coupled to the central processing unit and contains computer-executable instructions for performing the steps of: (a) receiving a digital video stream; (b) converting the digital video stream to a television input signal; (c) transmitting the television input signal to a television; (d) receiving a first capture command during (c); and (e) in response to (d), storing a first picture frame in a memory.

In still another embodiment of the invention, a method of creating an application selection item for a terminal is provided. The method includes receiving a broadcast signal including video data and converting the broadcast signal to a terminal input signal. Next, the terminal input signal is transmitted to a terminal display. After receiving a user-generated capture command, a picture frame derived from the received broadcast signal is stored into a non-volatile memory. The picture frame may then be displayed on the terminal display as an application selection item.

In other embodiments of the invention, computer-executable instructions for implementing the disclosed methods are stored on computer-readable media.

BRIEF DESCRIPTION OF THE DRAWINGS

The present invention is illustrated by way of example and not limited in the accompanying figures in which like reference numerals indicate similar elements and in which:

FIG. 5 shows a picture frame that is used in a puzzle game in accordance with an embodiment of the invention.

FIG. 6 shows a puzzle picture frame in accordance with an embodiment of the invention.

DETAILED DESCRIPTION OF THE INVENTION

Figure 1:
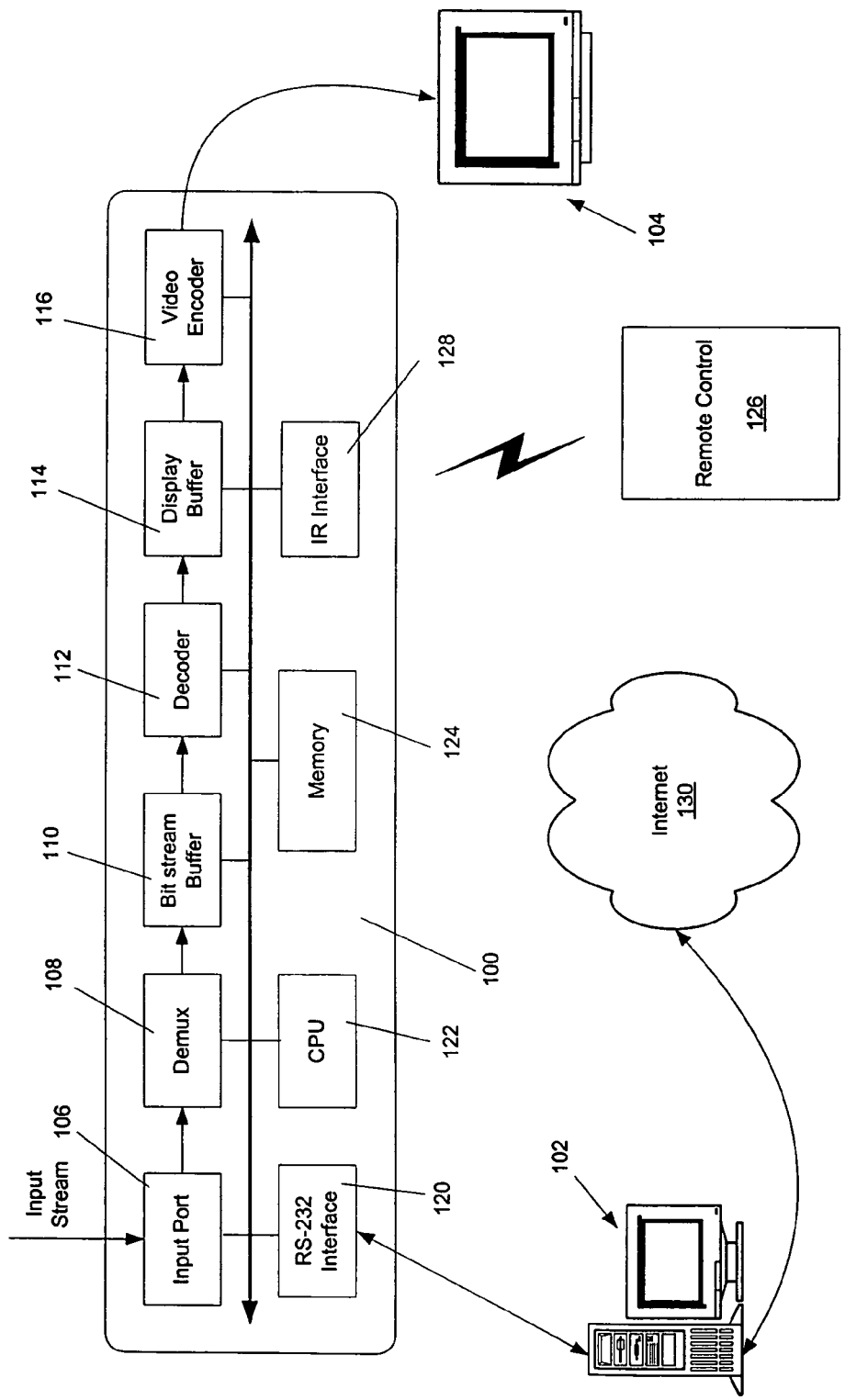
FIG. 1 shows a system that includes a digital broadcast receiver in accordance with an embodiment of the invention.

FIG. 1 shows a system for receiving and processing digital video signals in accordance with an embodiment of the invention. A digital broadcast receiver (set-top box) 100 may be coupled to a computer device 102 and to a television 104. In alternative embodiments, television 104 may be replaced with a terminal, such as one attached to a telephone, personal digital assistant, pager or other device. A digital input stream is received at the input port 106. The digital input stream may have a format such as DVB-S, DVB-C, DVB-T, MPEG-1, MPEG-2 or ISO-IEC standards 11172-1, 11172-2 and 11172-3. The digital input stream may also use a format disclosed by the Bluetooth Special Interest Group. Video and audio programs may be transmitted to digital broadcast receiver 100 over a variety of different frequencies and/or in multiplexed manner over a single carrier. A demultiplexer 108 may be included to isolate a desired audio or video program from the input stream. The isolated program may then be sent to a bit stream buffer 110. Bit stream buffer 110 buffers data that is sent to a decoder 112. Decoder 112 may be included to decode or descramble signals broadcast in a compressed format such as in an MPEG-1 or MPEG-2 format. In one embodiment, the output of decoder 112 is a baseband signal. The baseband signal leaving decoder 112 may then be transmitted to display buffer 114 before being transmitted to a video encoder 116. Video encoder 116 may then convert the baseband signal to a format that can be used by a television, such as the National Television Standards Committee (NTSC) standard or the Phase Alternating Line (PAL) standard.

Digital broadcast receiver 100 may also include an interface 120 for coupling the receiver to computer device 102 or other devices. An RS-232 interface may be utilized to provide a standard interface for connecting to additional devices. Of course, other interfaces, such as USB or IEEE 1394 interfaces may also be used. A central processing unit (CPU) 122 may be included to control the overall operation of digital broadcast receiver 100. Computer executable instructions and data used by CPU 122 and other components within digital broadcast receiver 100 may be stored in a memory 124. Memory 124 may be implemented with any combination of read only memory modules or random access memory modules.

A user may control the operation of digital broadcast receiver 100 with a remote control 126. A conventional infrared (IR) interface 128 may be included to receive information from remote control 126.

Figure 2:
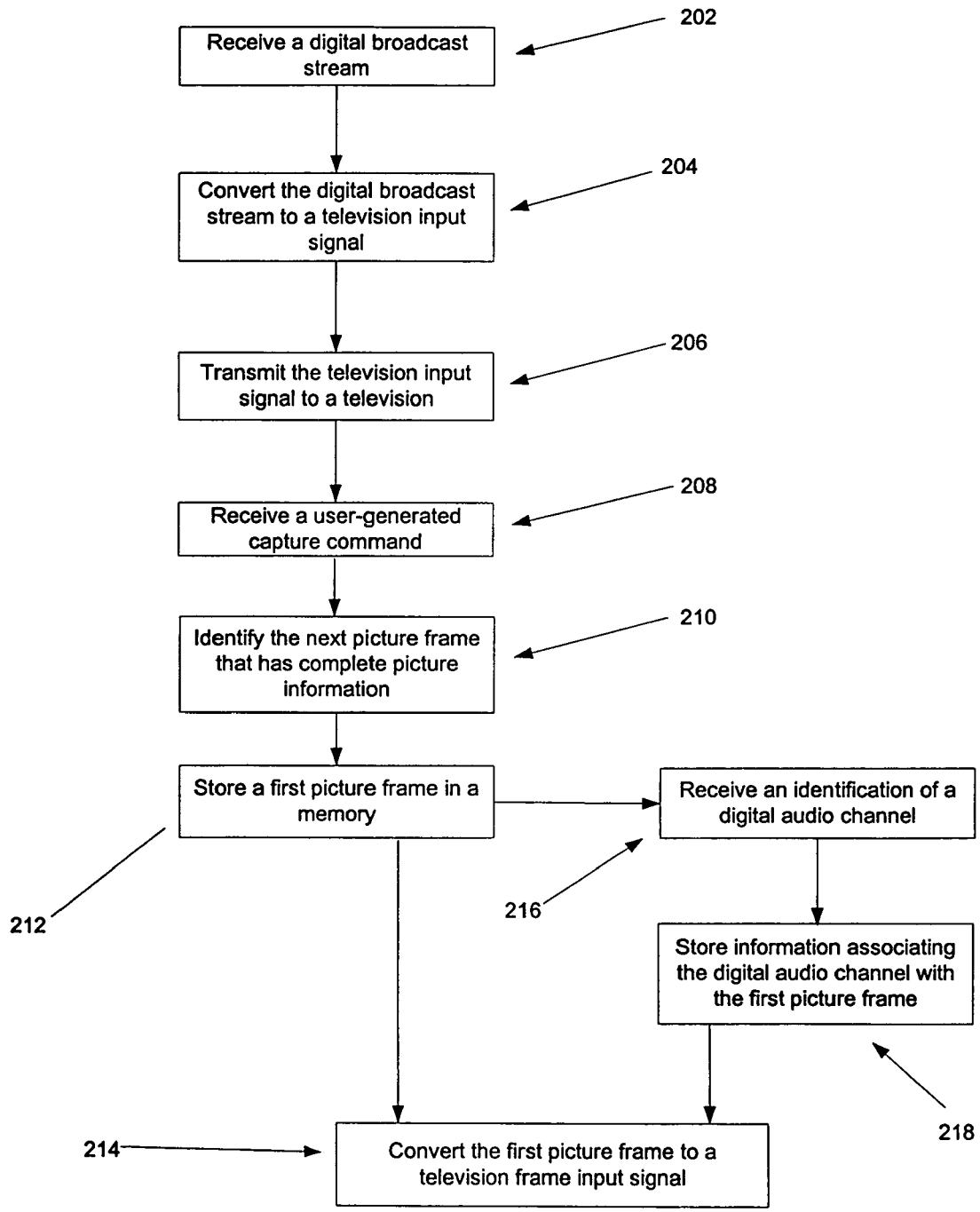
FIG. 2 illustrates a method of capturing and utilizing picture frames in accordance with an embodiment of the invention.

A method for customizing the operation of the digital broadcast receiver in accordance with an embodiment of the invention is shown in FIG. 2. In particular, FIG. 2 illustrates a method for generating a background image for a television, computer monitor or other device. First, in step 202, a digital video stream is received at a digital broadcast receiver. The digital video stream may be received from a cable television provider, satellite television provider or other source of digital video and/or audio programming. Next, in step 204 the digital video stream is converted to a television input signal. The conversion may include transforming an MPEG-2 or other digital signal into an NTSC or PAL signal. Such conversion circuits and software are well-known to those skilled in the art.

The television input signal is then transmitted to a television or other devices in step 206. While viewing the television program, the user may see a picture that the user would like to store as a background screen for the television or other device (e.g., computer device). The user may make a selection with remote control 126 or on an interface of digital broadcast receiver 100 to select the picture. After receiving a capture command in step 208, the digital video stream is monitored and the next picture frame that has complete picture information is identified in step 210. The capture command may come from a mobile phone terminal, computer terminal, remote control or other device. When the digital video stream is in MPEG format, the stream contains I, P and B picture frames. In one variation, only the I picture frames form complete pictures that can be used as background images. P and B frames contain only a portion of the information needed to form a complete image. Step 210 may include monitoring the digital video stream to identify the next I picture frame and may be performed by decoder 112.

After a proper picture frame is identified, in step 212 the picture frame is stored in a memory, such as memory 124. The memory may be a non-volatile or, alternatively, a volatile memory. The picture frame may be retrieved from memory 124 and transmitted to display buffer 114 or video encoder 116 to be displayed on television 104 or a computer monitor through a computer interface. Video encoder 116 may convert the picture frame to a television frame input signal in step 214. The picture frame may be displayed on a television at times determined by the user. In one embodiment, the picture frame is displayed on the television while the user listens to audio programming. As shown in FIG. 2, in step 216, digital broadcast receiver 100 may receive the identification of a digital audio channel. This step may be performed by the user making an appropriate selection with remote control 126. Then in step 218, information associating the digital audio channel with the picture frame may be stored in a memory, such as memory 124. The association may be in the form of computer-executable instructions causing the picture frame to be retrieved from the memory when digital broadcast receiver 100 is tuned to the audio channel. In one embodiment, the user may view prompts on a television screen instructing the user to enter information to make the association.

Figure 3:
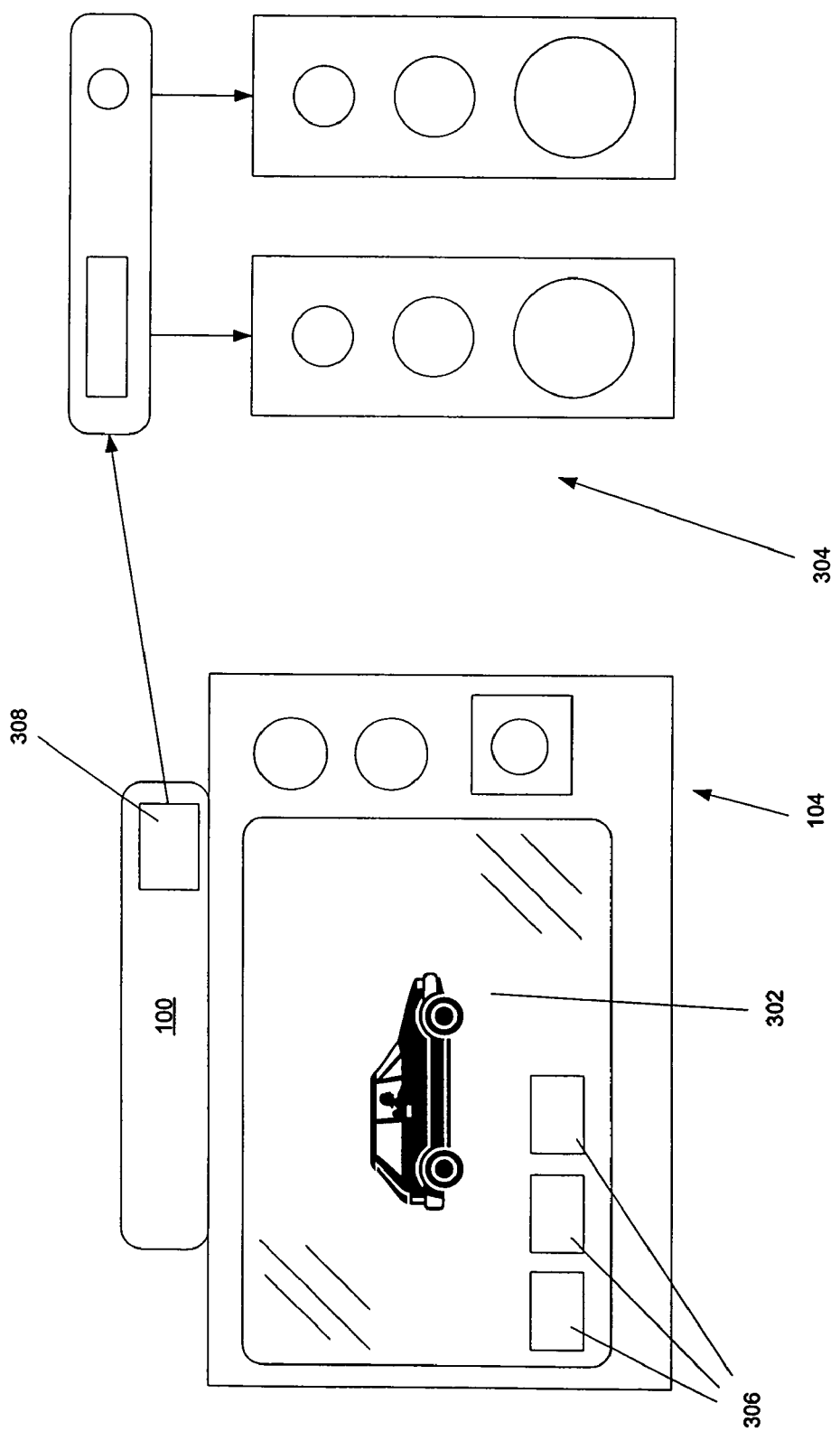
FIG. 3 illustrates a system that includes a digital broadcast receiver, television and stereo system in accordance with an embodiment of the invention.
Figure 3A:
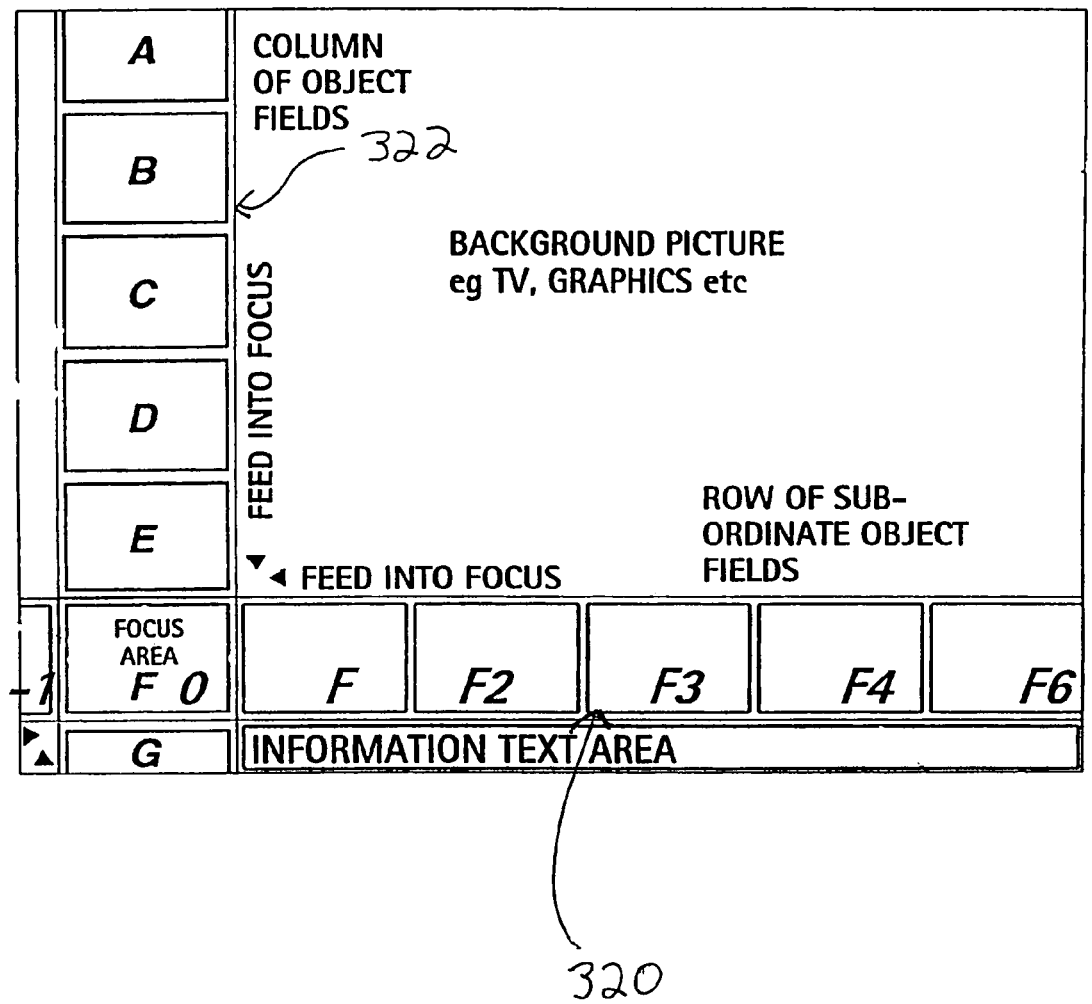
FIG. 3a illustrates a terminal display screen that includes navigation bars in accordance with an embodiment of the invention.

FIG. 3 also shows a series of application selection items 306. In one embodiment, the application selection items are icons formed by reducing the size of picture frames. FIG. 3a shows an embodiment in which application selection items are arranged in a column 320 and a row 322 as part of navigation bars. The application selection items or icons may be linked to computer executable instructions or data files in a conventional manner.

One skilled in the art will appreciate that the present invention is not limited to the use of a single picture frame. In one embodiment, the user may select a plurality of picture frames and the picture frames may be transmitted to television 104 in a predetermined or random order. The picture frames may then be displayed on television 104 during different time periods. FIG. 3 illustrates an embodiment in which a background image 302 is displayed on television 104. Digital broadcast receiver 100 transmits audio signals to a stereo system 304 via an audio output interface 308 while transmitting background images to television 104. While listening to stereo system 304, the user may view one, two or a series of background images on television 104 at the same time or during different time periods. In one embodiment, audio data may be captured from MPEG data streams in the manner described above.

Figure 4:
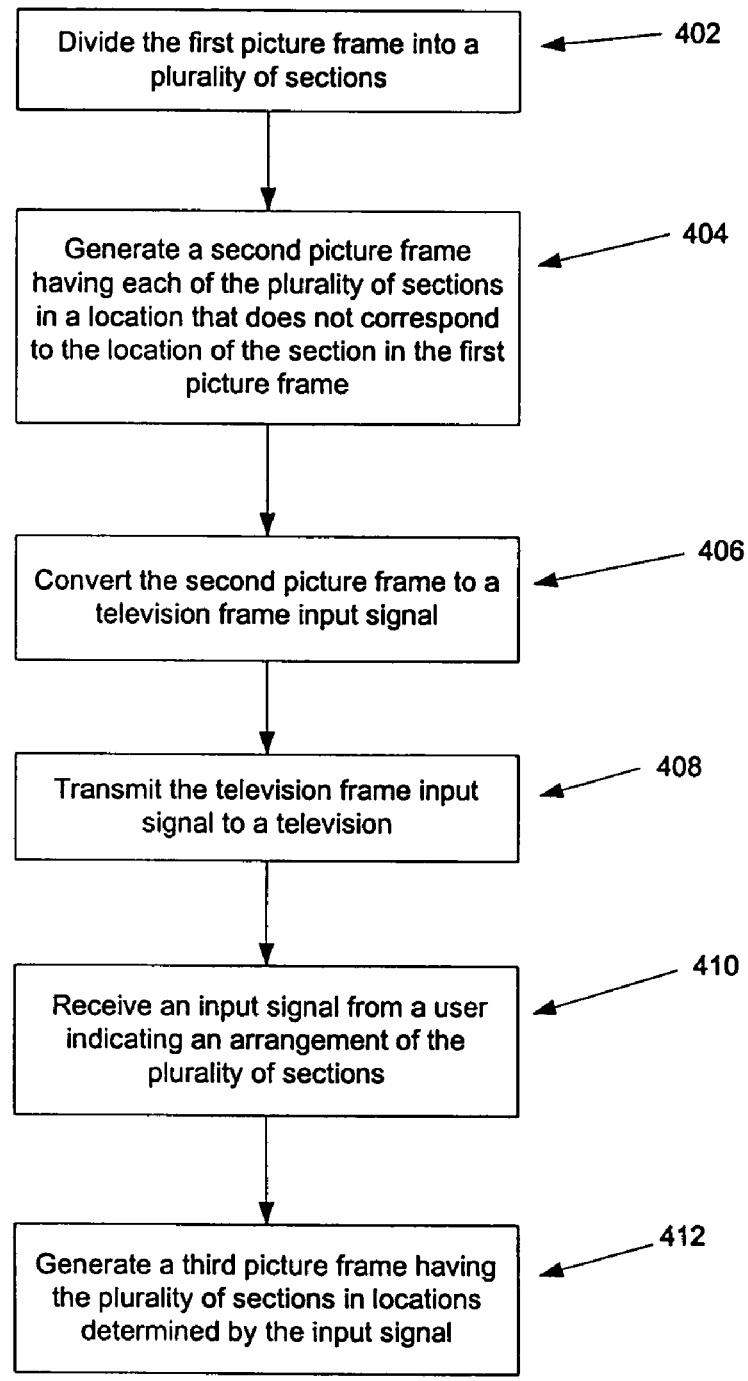
FIG. 4 illustrates a puzzle game method in accordance with an embodiment of the invention.

Digital broadcast receiver 100 may include computer executable instructions that allow users to manipulate images and participate in a variety of different games and exercises. FIG. 4 illustrates a method that may be performed by a digital broadcast receiver to generate a puzzle game. A picture frame may be chosen by the user, or alternatively, chosen by the receiver. In step 402, a captured picture frame is divided into a plurality of sections. FIG. 5 shows a picture frame 500 divided into a plurality of sections. While the sections shown in FIG. 5 are all the same size, in other embodiments, the sections may have different sizes and shapes. Furthermore, in still further embodiments, the user may select a complexity level. The size and shapes of the puzzle pieces may be a function of the complexity level. The division of the picture frame into a plurality of sections is well within the skill of a practitioner in the art. In one embodiment, memory 124 may include computer-executable instructions for assigning sections of the picture frame corresponding to predetermined ranges of pixels to sections. For example, in an embodiment with six sections, each section may be 240*192 pixels. CPU 122 may be programmed to identify the sections of the input stream that correspond to the pixel sections shown on television 104. Other games are described in GB 0113218.2, filed on May 31, 2001, the entire disclosure of which is incorporated by reference. Short range wireless communication systems, such as those that use an LPRF link, may be utilized to download games and content to the digital broadcast receiver.

In step 404, a second picture frame is generated. The second picture frame may include the plurality of sections from the first picture frame placed in different locations. FIG. 6 shows a picture frame 600 having the plurality of sections from FIG. 5 placed in a random order. When the user decides to play the puzzle game, the second picture frame may be converted to a television frame input signal in step 406. Step 406 may be performed by retrieving the second picture frame from memory 124 and transmitting the second picture frame to video encoder 116. The television frame input signal may then be transmitted to a television in step 408 so that the user can view the puzzle.

Next, in step 410, an input signal is received from the user indicating an arrangement of the plurality of sections. The arrangement may be the user's attempt to solve the puzzle. There are number of different ways in which the user can provide such information. For example, each section in FIG. 6 may be assigned a number and the user may identify a current section and the sections the user wishes to move that section to.

Finally, in step 412, a third picture frame having the plurality of sections in locations determined by the user may be generated. The third picture frame may be generated after each section is rearranged or after the user has determined new locations for each of the sections the user wishes to move. CPU 122 may be programmed to rearrange sections of the second picture frame to generate the third picture frame.

Figure 7:
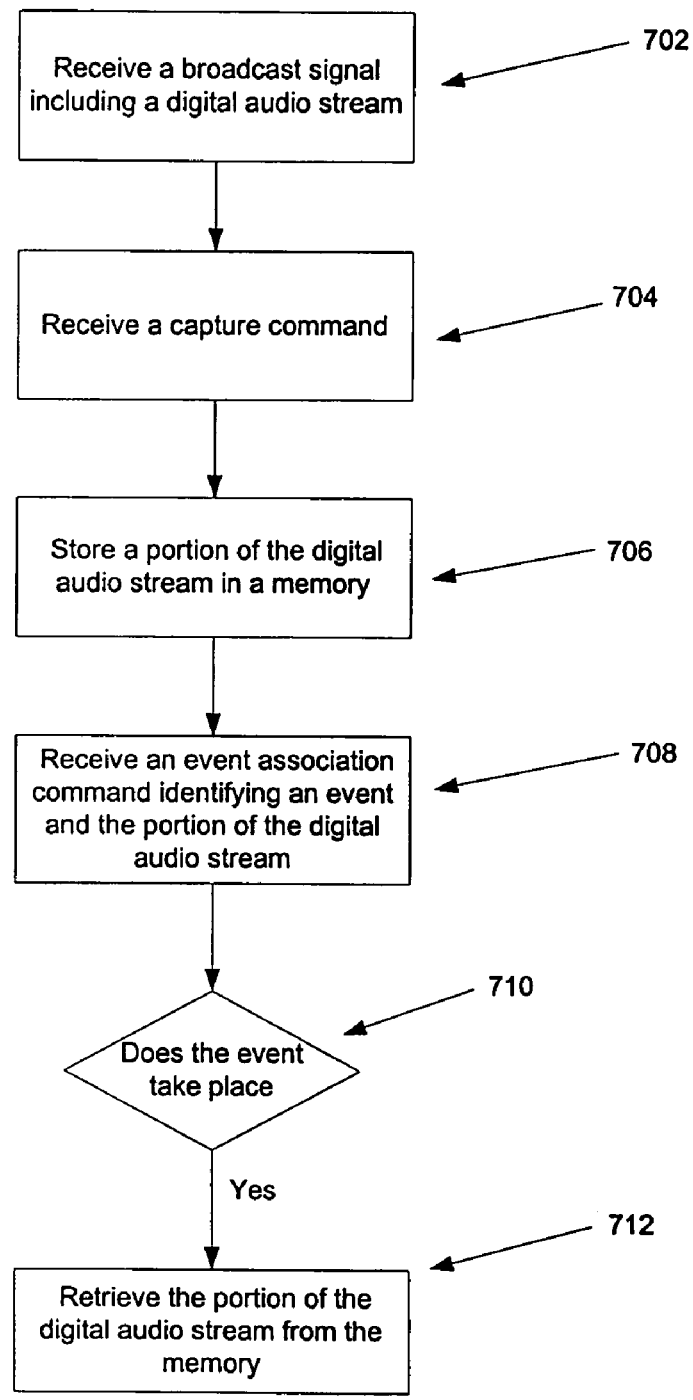
FIG. 7 illustrates a method of assigning audio clips to receiver events in accordance with an embodiment of the invention.

As shown in FIG. 3, the present invention may be used with digital audio signals as well as digital video signals. FIG. 7 illustrates an embodiment for customizing a digital broadcast receiver by assigning audio clips to different receiver events. In step 702, the digital broadcast receiver receives a broadcast signal including a digital audio stream. The digital audio stream may be part of a digital video stream, may be part of an audio channel transmitted by the same service provider providing the digital video stream or may be delivered in any other manner. While listening to an audio program, the user may desire to capture a section of the audio stream. In step 704, the digital broadcast receiver 100 receives a capture command from the user. The user may transmit the capture command with remote control 126, enter the command on an interface attached to digital broadcast receiver 100 or enter the command in another manner that indicates that the user desires to capture a section of audio stream. In one embodiment, the capture command can include selecting a button on remote control 126 followed by a time period. For example, if the user desires to capture the previous five seconds of an audio stream, the user may select an audio capture button (not shown) on remote control 126 followed by the number 5.

A portion of the digital audio stream may then be stored in the memory in step 706. Bit stream buffer 110 or display buffer 114 may include hardware and/or computer-executable instructions for storing audio and/or visual bit streams for a period of time after corresponding signals are transmitted to television 104, stereo system 304 or other devices. The appropriate section of the buffered data may then be retrieved from bit stream buffer 110 or display buffer 114 after receiving a capture command and the data may be stored in a memory.

After capturing a section of a digital audio stream, the user may then assign the captured digital audio stream to a receiver event. Events may include the start up of digital broadcast receiver 100, the selection of one of the icons 306 (shown in FIG. 3) and a time of day. For example, receiver 100 may be programmed to play an audio clip at a predetermined time of day. Icons 306 may form part of a navigation bar and the selection of a navigation bar may also be an event.

After one of the events takes place in step 710, the corresponding portion of the digital audio stream may be retrieved from a memory in step 712 and may then be transmitted to a device such as television 104 or stereo system 304. For example, during the start up of digital audio receiver 100, the audio clip identified by the user may be transmitted to television 104 or stereo system 304.

In other embodiments of the invention, computer device 102 may be used to transmit audio and video data to digital broadcast receiver 100. Computer device 102 may be connected to a wide area network such as the Internet 130 to obtain icons, background images and audio and video clips. Computer device 102 and/or digital broadcast receiver 100 may also be connected to other input devices, such as scanners, cameras and MP3 players. Video and audio data may also be transferred from digital broadcast receiver 100 to computer device 102. Computer device 102 may use the video and audio data to customize user interface screens, backgrounds, screen savers add sound to computer device events or otherwise customize the computer device. Computer device 102 may also convert the video and audio data to other formats and transmit the data to other entities connected to the Internet 130 (e.g., as attachments to e-mail messages).

While the invention has been described with respect to specific examples, those skilled in the art will appreciate that there are numerous variations and permutations of the above described systems and techniques that fall within the spirit and scope of the invention as set forth in the appended claims. For example, one or more of the components shown within digital broadcast receiver 100 may be located within one or more other devices, such as a television or stereo receiver. Moreover, the disclosed methods may be implemented as computer-executable instructions recorded on a computer readable medium such as a floppy disk or CD-ROM.

I claim:

1. A method of generating an event sound for a digital broadcast receiver, the method comprising:
   (a) receiving a broadcast signal including a digital audio stream;
   (b) receiving a user-generated capture command;
   (c) in response to (b), storing a portion of the digital audio stream in a memory;
   (d) receiving information that associates an event and the portion of the digital audio stream; and
   (e) retrieving the portion of the digital audio stream from the memory when the event takes places.

2. The method of claim 1, wherein the event comprises the startup of the digital broadcast receiver.

3. The method of claim 1, wherein the event comprises the selection of an icon on a user interface.

4. The method of claim 1, wherein the event comprises a time of day.

5. The method of claim 1, wherein the event comprises the shutdown of the digital broadcast receiver.

6. A computer-readable medium having computer-executable instructions for performing the steps comprising:
   (a) receiving a broadcast signal including a digital audio stream;
   (b) receiving a user-generated capture command;
   (c) in response to (b), storing a portion of the digital audio stream in a memory;

(d) receiving information that associates an event and the portion of the digital audio stream; and (e) retrieving the portion of the digital audio stream from the memory when the event takes places.

7. A digital broadcast receiver comprising:

a central processing unit;

a memory module coupled to the central processing unit and containing computer-executable instructions that causes the receiver to perform the steps of:

(a) receiving a broadcast signal including video and audio data;

(b) converting the broadcast signal to a television input signal;

(c) transmitting the television input signal to a television;

(d) receiving a first user-generated capture command during (c);

(e) in response to (d), storing a first picture frame in a memory;

(f) dividing the first picture frame into a plurality of sections;

(g) generating a second picture frame having each of the plurality of sections in a location that does not correspond to the location of the section in the first picture frame;

(h) receiving a second user-generated capture command;

(i) in response to (h), storing a portion of the digital audio data in a memory;

(j) receiving information that associates an event and the portion of the digital audio data;

(k) retrieving the portion of the digital audio data from the memory when the event takes places; and an interface module for coupling the receiver to a computer device.

\* \* \* \* \*